(12) United States Patent
Kitai et al.

(10) Patent No.: US 9,065,938 B2
(45) Date of Patent: Jun. 23, 2015

(54) APPARATUS, SYSTEM, AND METHOD OF INSPECTING IMAGE, AND RECORDING MEDIUM STORING IMAGE INSPECTION CONTROL PROGRAM

(71) Applicants: Tadashi Kitai, Kanagawa (JP); Hitomi Kaneko, Saitama (JP); Hiroyoshi Ishizaki, Kanagawa (JP); Keiji Kojima, Kanagawa (JP); Hiroyuki Kawamoto, Kanagawa (JP); Keiichi Miyamoto, Kanagawa (JP)

(72) Inventors: Tadashi Kitai, Kanagawa (JP); Hitomi Kaneko, Saitama (JP); Hiroyoshi Ishizaki, Kanagawa (JP); Keiji Kojima, Kanagawa (JP); Hiroyuki Kawamoto, Kanagawa (JP); Keiichi Miyamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 76 days.

(21) Appl. No.: 13/790,086

(22) Filed: Mar. 8, 2013

(65) Prior Publication Data

US 2013/0250369 A1 Sep. 26, 2013

(30) Foreign Application Priority Data

Mar. 22, 2012 (JP) ................ 2012-065459

(51) Int. Cl.
*H04N 1/00* (2006.01)
*G06T 7/00* (2006.01)
*G06K 9/03* (2006.01)
*G06K 9/32* (2006.01)

(52) U.S. Cl.
CPC ............ *H04N 1/00005* (2013.01); *G06T 7/001* (2013.01); *G06T 2207/30144* (2013.01); *G06K 9/036* (2013.01); *G06K 9/32* (2013.01)

(58) Field of Classification Search
USPC .................................................. 358/1.1–3.29
See application file for complete search history.

(56) References Cited

U.S. PATENT DOCUMENTS

2011/0075890 A1* 3/2011 Yasuda et al. ................. 382/112

FOREIGN PATENT DOCUMENTS

| JP | 2003-054096 | 2/2003 |
|---|---|---|
| JP | 2005-049212 | 2/2005 |
| JP | 2006-231693 | 9/2006 |
| JP | 2007-310567 | 11/2007 |

OTHER PUBLICATIONS

English Machine Translation of Japanese Publication No. 2005-049212, Published on Feb. 24, 2005, by Hyoki Kemji et al. (Print Quality Inspection Device and Method).*

* cited by examiner

*Primary Examiner* — Marcellus Augustin
(74) *Attorney, Agent, or Firm* — Cooper & Dunham LLP

(57) ABSTRACT

An apparatus, system, method, and a non-transitory recording medium storing an image inspection control program, each of which is capable of inspecting a printed image based on comparison between a read image read from the printed image and an inspection image. As a portion of the read image is obtained, the size of the obtained portion of the read image is corrected to match the size of the inspection image, using a magnification ratio previously obtained. After matching the sizes of the read image and the inspection image, the read image is compared with the inspection image to inspect the read image.

20 Claims, 10 Drawing Sheets

PREPRINT IMAGE + VARIABLE IMAGE = READ IMAGE

FIG. 9
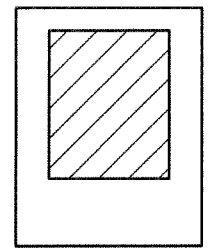
FIG. 10A
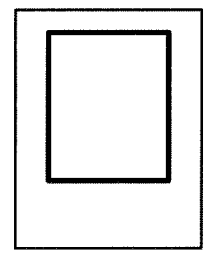
FIG. 10B
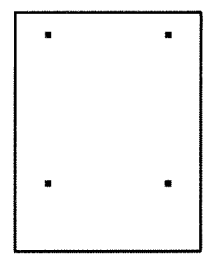
FIG. 10C

FIG. 11A

| -1 | -1 | -1 | -1 | -1 |
|----|----|----|----|----|
| -1 | -1 | -1 | -1 | -1 |
| -1 | -1 | 1  | 1  | 1  |
| -1 | -1 | 1  | 1  | 1  |
| -1 | -1 | 1  | 1  | 1  |

FIG. 11B

| -1 | -1 | -1 | -1 | -1 |
|----|----|----|----|----|
| -1 | -1 | -1 | -1 | -1 |
| 1  | 1  | 1  | -1 | -1 |
| 1  | 1  | 1  | -1 | -1 |
| 1  | 1  | 1  | -1 | -1 |

FIG. 11C

| -1 | -1 | 1  | 1  | 1  |
|----|----|----|----|----|
| -1 | -1 | 1  | 1  | 1  |
| -1 | -1 | 1  | 1  | 1  |
| -1 | -1 | -1 | -1 | -1 |
| -1 | -1 | -1 | -1 | -1 |

FIG. 11D

| 1  | 1  | 1  | -1 | -1 |
|----|----|----|----|----|
| 1  | 1  | 1  | -1 | -1 |
| 1  | 1  | 1  | -1 | -1 |
| -1 | -1 | -1 | -1 | -1 |
| -1 | -1 | -1 | -1 | -1 |

FIG. 12
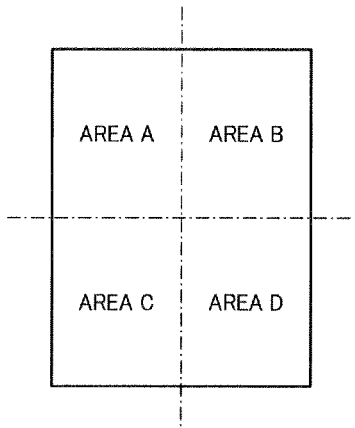
FIG. 13
| COORDINATE NUMBER | COORDINATE |
|---|---|
| #1 | ( xxx , xxx) |
| #2 | ( xxx , xxx) |
| #3 | ( xxx , xxx) |
| ... | |
FIG. 14A       FIG. 14B
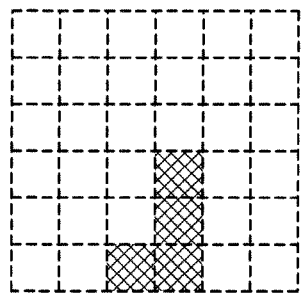 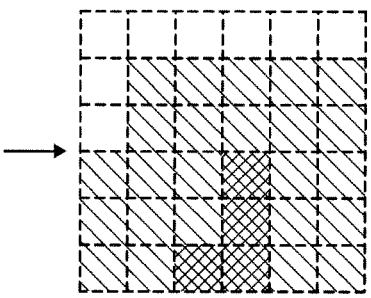

APPARATUS, SYSTEM, AND METHOD OF INSPECTING IMAGE, AND RECORDING MEDIUM STORING IMAGE INSPECTION CONTROL PROGRAM

CROSS-REFERENCE TO RELATED APPLICATIONS

This patent application is based on and claims priority pursuant to 35 U.S.C. §119 to Japanese Patent Application No. 2012-065459, filed on Mar. 22, 2012, in the Japan Patent Office, the entire disclosure of which is hereby incorporated by reference herein.

BACKGROUND

1. Field of the Invention

The present invention relates to an apparatus, system, and method of inspecting an image and a non-transitory recording medium storing an image inspection control program, and more specifically, to inspecting an image formed on a recording sheet having a previously printed image.

2. Description of the Related Art

Conventionally, inspection of printed matter is performed by human operators. In recent years, an inspection apparatus that automatically inspects printed matter is widely used, mainly in the field of offset printing. For example, a master image is generated by reading specific printed matter that is selected based on the image quality, as a reference image. The corresponding portions of the master image and a read image of printed matter are compared to determine, by the degree of difference therebetween, whether there is a defect in the printed matter.

The printing apparatus, such as electrophotographic apparatus, is widely used to print a small number of pages. For example, the printing apparatus may perform variable printing in which the contents to be printed differ in each page. In such case, comparing the printed matter, with the master image generated from the printed matter, would be inefficient. In view of this, a master image may be generated based on print data to be output as a printed image of printed matter, and compared with the printed image subjected for inspection.

In order to compare between the master image and the printed image subjected for inspection, the sizes and the positions of the images need to be matched. Japanese Patent Application Publication No. JP-2005-49212-A proposes a method of matching the position and the size of the images, in which the projection waveforms in the horizontal and vertical directions are generated and corrected such that the peaks of the waveforms match.

When the image is printed on a blank recording sheet, a read image obtained by reading the printed image can be compared with a master image to inspect the read image. In case of preprint printing, in which data of a variable image that varies from sheet to sheet is printed on a preprint sheet, that is, a recording sheet having a previously printed image ("preprint image") such as rule lines or template statements, the read image cannot be simply compared with the master image. Since the read image includes the preprint image and the variable image, it cannot be simply compared with the master image generated based on the variable image data. Rather, the master image is generated by combining the variable master image and the preprint image, and compared with the read image. The preprint image used for generating the master image is obtained by reading the preprint sheet having no variable image printed thereon.

SUMMARY

When forming an image on a recording sheet, the position on the recording sheet on which the image is formed may be shifted, causing a registration shift. Assuming that the registration shift occurs when the variable image is formed on the preprint sheet, the position of the variable image would be shifted with respect to the preprint image previously formed on the recording sheet. In such case, the preprint image and the variable image need to be matched in their positions before combining the preprint image and the variable image into the master image. Further, the recording sheet having the printed image formed thereon may shrink in size during print processing, thus causing reduction in size of the read image subjected for inspection. In such case, the preprint image and the variable image need to be matched in their sizes before combining the preprint image and the variable image into the master image.

The inventors of the present invention have considered that, in order to accurately correct the sizes and the positions of the images using the technique described in Japanese Patent Application Publication No. JP-2005-49212-A, it would be desirable to process the image data of one entire page at least in the sub-scanning direction. In such case, a reference point is extracted from the read image, after one page of the read image is read from the printed image. This increases the processing time as inspection can start only after one page of the read image is obtained.

In view of the above, the inventors of the present invention have discovered that there is a need for an apparatus, a system, a method, and a non-transitory recording medium storing an image inspection control program, each of which is capable of inspecting a printed image based on comparison between a read image read from the printed image and a master image, with the reduced processing time.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is an illustration of an example edge extraction filter to be applied to the image to generate an edge image;

FIGS. 10A to 10C are an illustration for explaining example operation of extracting corners of the image as a reference point;

FIGS. 11A to 11D are an illustration for explaining a corner extraction filter used for extracting the corners of the image;

FIG. 12 is an illustration for explaining example operation of segmenting the image into a plurality of image areas;

FIG. 13 is an example data structure of a reference point table, managed by the inspection apparatus of FIG. 3;

FIGS. 14A and 14B are illustration for explaining operation of applying pixel expansion to the preprint image;

Figure 1:
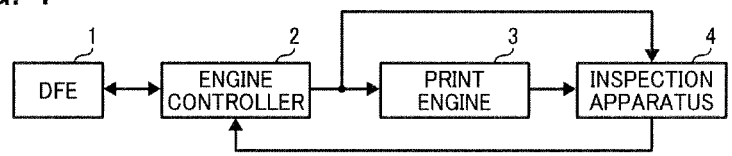
FIG. 1 is a schematic block diagram illustrating an image forming system including an inspection apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following examples, an image forming system including an inspection apparatus that inspects a printed image is described. More specifically, the printed image includes an output target image formed on a recording sheet having a preprint image. The output target image may be a variable image, which is an image generated based on information specific to each document, such as the image generated based on form data. The preprint image is any image that is previously printed onto the recording sheet, such as rule lines.

Further, in the following examples, the variable image may correspond to data that causes the print engine 3 to output a variable image, or the variable image being output. The preprint image may correspond to data that causes the print engine 3 to output a preprint image, the preprint image being output, or a preprint layer of the master image to be used for inspection. The output target inspection image may be the variable master image, which corresponds to data of a variable master image, or a variable image layer, of the master image to be used for inspection. The inspection image to be used for inspecting the printed image may be the master image. The master image, which is generated by combining the variable master image and the preprint master image, may correspond to data of a master image to be used for inspection. The preprint master image reflects the preprint image that is previously provided on the recording sheet. For example, the preprint image may function as the preprint master image to be used for inspecting at least a preprint image layer of the read image.

FIG. 1 illustrates an entire configuration of an image forming system. The image forming system of FIG. 1 includes a digital front end (DFE) 1, an engine controller 2, a print engine 3, and an inspection apparatus 4. The DFE 1 generates image data, such as bitmap data of image data to be output according to a print job received from the outside, and outputs the bitmap data to the engine controller 2.

The engine controller 2 controls the print engine 3 based on the bitmap data received from the DFE 1 to output a printed image. The engine controller 2 further inputs the bitmap data as variable image data to be used for generating master image data, to the inspection apparatus 4.

The print engine 3 forms an image on a recording sheet based on the bitmap data under control of the engine controller 2, reads the printed image using a reading device 302 to generate read image data, and inputs the read image data to the inspection apparatus 4 as a read image. Further, in this example, the print engine 3 scans a preprint sheet into preprint image data, and inputs the preprint image data to the inspection apparatus 4 as a preprint image. The preprint image is used for inspection of the printed image. In this example, the preprint image, which is previously printed on the recording sheet such as the preprint sheet, may be alternatively referred to as a previously displayed image. The image generated by reading the preprint image, such as the preprint image data, may be alternatively referred to as previously displayed image data.

The inspection apparatus 4 generates a master image to be used for inspecting the output result of the print engine 3, based on the variable image data input from the engine controller 2 and the preprint image data. The inspection apparatus 4 compares the read image read from the printed image output from the print engine 3, with the master image, to inspect the printed image.

Figure 2:
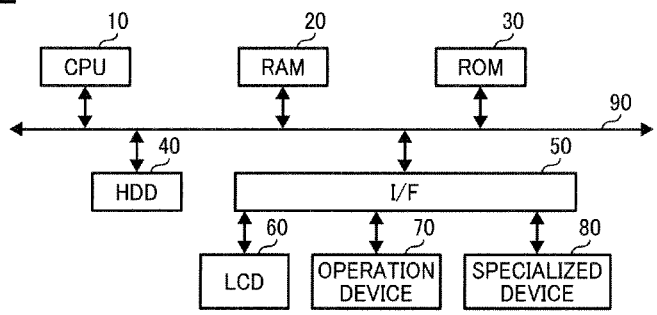
FIG. 2 is a schematic block diagram illustrating a hardware structure of a control section of any one of an engine controller, a print engine, and the inspection apparatus of FIG. 1, according to an example embodiment of the present invention.

Referring now to FIG. 2, a hardware structure of the inspection apparatus 4 is explained according to an example embodiment of the present invention.

As illustrated in FIG. 2, the inspection apparatus 4 is implemented by an information processing apparatus such as a personal computer or a server computer. The inspection apparatus 4 includes a central processing unit (CPU) 10, a random access memory (RAM) 20, a read only memory (ROM) 30, a hard disk drive (HDD) 40, and an interface (I/F) 50, which are connected through a bus 90. The inspection apparatus 4 further includes a liquid crystal display (LCD) 60, an operation device 70, and a specialized device 80, which are connected to the I/F 50.

The CPU 10 is implemented by a processor such as a microprocessor, which is capable of controlling entire operation of the inspection apparatus 4. The RAM 20 is implemented by a volatile memory that writes various data thereto or reads various data therefrom with relatively high speeds. The RAM 20 may be used as a work memory area of the CPU 10. The ROM 30 is implemented by a nonvolatile memory from which various data is read. The ROM 30 may store various programs such as firmware. The HDD 40 is implemented by a nonvolatile memory from which various data is read. The HDD 40 may store various control programs such as an operating system (OS), and application programs such as the inspection control program.

The I/F 50 allows various hardware devices to be connected through the bus 90 or to the outside through a network, and controls these connections. The LCD 60 functions as a user interface, which allows a user to visually check status of the inspection apparatus 4. The operation device 70 functions as a user interface, which allows the user to input various data to the inspection apparatus 4 using, for example, a keyboard or a mouse. The LCD 60 and the operation device 70 may be integrated into one device, for example, in the form of a touch panel screen.

The specialized device 80 is a hardware device that causes the information processing apparatus of FIG. 2 to additionally have specialized functions to cause the information processing apparatus to function as the inspection apparatus 4. More specifically, with the specialized device 80, the CPU 10 converts the binary image into the multivalue image to generate the master image, or compares the master image with the read image of the printed image. The specialized device 80 may be implemented by, for example, Application Specific Integrated Circuit (ASIC) capable of performing image processing with relatively high processing speeds.

The specialized functions of the inspection apparatus 4 may be alternatively implemented by software, such as the inspection control program that is stored in a memory such as the ROM 30, HDD 40, or any desired recording medium such as an optical disc. When executed by the CPU 10, the inspection control program may be read onto the RAM 20 to cause the CPU 10 to control various hardware devices of FIG. 2 according to the control program.

Alternatively, the specialized functions of the inspection apparatus 4 may be realized by a combination of software and hardware such as a combination of the inspection control program and the ASIC of the specialized device 80.

The control section of the print engine 3 is substantially similar in hardware structure to the inspection apparatus 4 of FIG. 2, except for the specialized device 80. The specialized device 80 causes the information processing apparatus of FIG. 2 to additionally have specialized functions such that the information processing apparatus functions as the print engine 3. More specifically, the specialized device 80 of the print engine 3 includes a plotter that forms a printed image on a recording sheet, and a reading device that reads the printed image into read image data.

The control section of the engine controller 2 is substantially similar in hardware structure to the inspection apparatus 4 of FIG. 2, except for the specialized device 80. The specialized device 80 causes the information processing apparatus of FIG. 2 to additionally have specialized functions such that the information processing apparatus functions as the engine controller 2. For example, the specialized device 80 causes the engine controller 2 to control forming of a printed image and inspecting of the printed image using the inspection apparatus 4.

Figure 3:
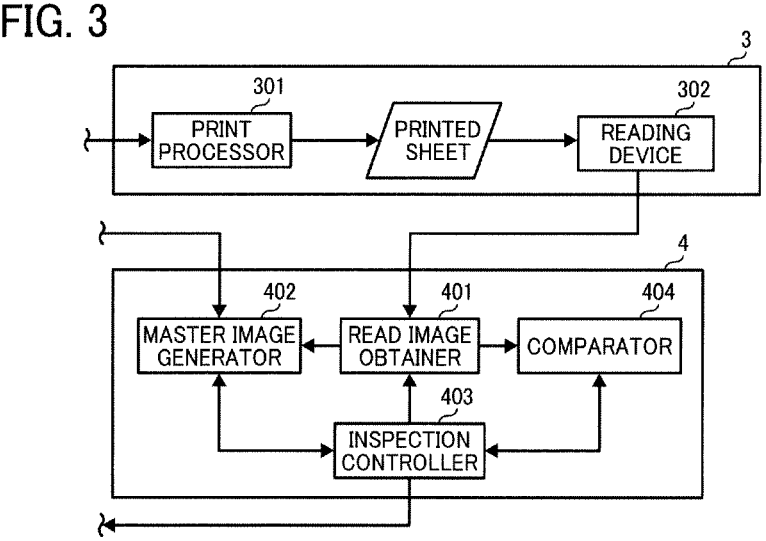
FIG. 3 is a schematic block diagram illustrating a functional structure of the print engine and the inspection apparatus of FIG. 1, according to an example embodiment of the present invention.

FIG. 3 illustrates a schematic block diagram illustrating functional structures of the print engine 3 and the inspection apparatus 4, according to an example embodiment of the present invention. As illustrated in FIG. 3, the print engine 3 includes a print processor 301 and the reading device 302. The inspection apparatus 4 includes a read image obtainer 401, a master image generator 402, an inspection controller 403, and a comparator 404.

Figure 4:
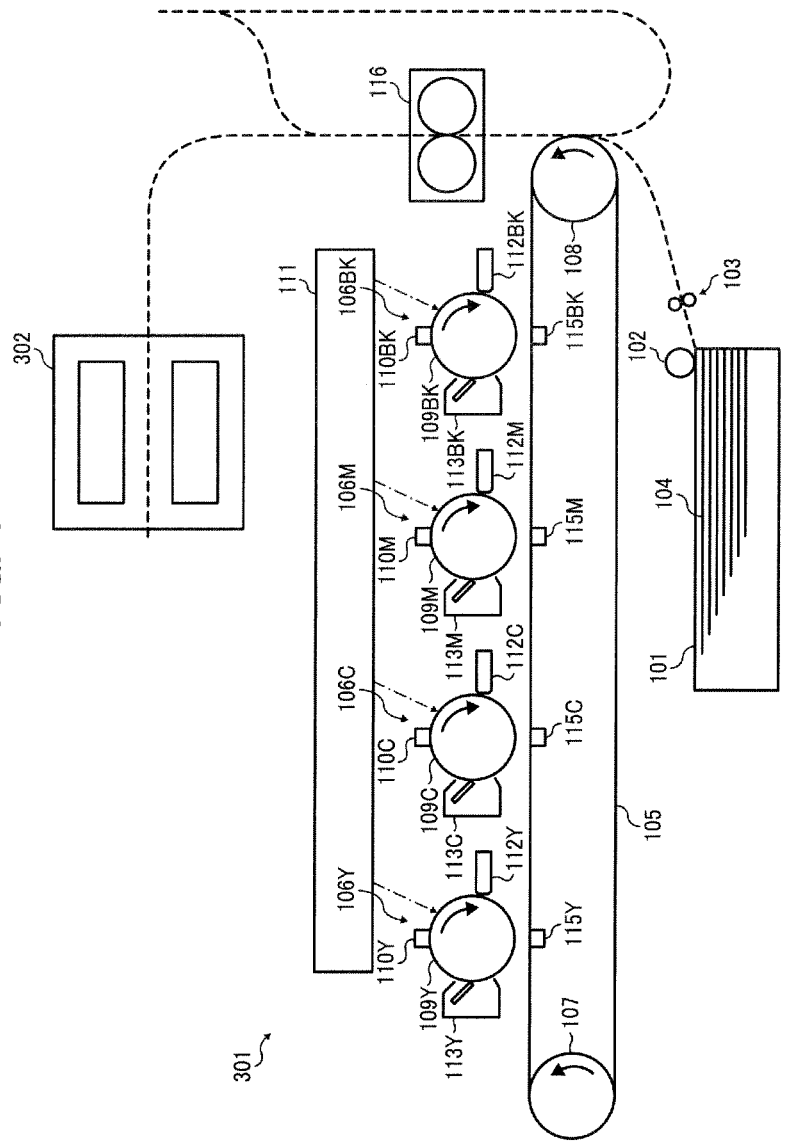
FIG. 4 is a schematic block diagram illustrating a mechanical structure of the print engine of FIG. 1, according to an example embodiment of the present invention.

The print processor 301 obtains the bitmap data input from the engine controller 2, and forms an image of the bitmap data on a recording sheet to output the recording sheet having a printed image. In this example, the print processor 301 is implemented by an image forming device that forms an image using the electrophotographic method, such as a tandem-type image forming device as illustrated in FIG. 4. Alternatively, the print processor 301 may be implemented by any other desired image forming device such as an inkjet printer.

The reading device 302 reads the printed image formed on the recording sheet, which is output from the print processor 301, into read image data ("read image"), and outputs the read image to the inspection apparatus 4. In this example, the reading device 302 may be implemented by a line scanner, which is provided in the print engine 3 such that the reading device 302 can scan the printed image formed on the recording sheet as the recording sheet is transferred and output from the print engine 3. For example, the reading device 302 may be disposed along a transfer passage through which the recording sheet is transferred. As the recording sheet is being transferred, the reading device 302 reads the printed image formed on the recording sheet by scanning the surface of the recording sheet. Further, the reading device 302 scans the preprint sheet into a preprint image, and outputs the preprint image to the inspection apparatus 4. As described above, the preprint sheet is a recording sheet having the previously printed image. In this example, the reading device 302 outputs the read image in which each image pixel is expressed by eight bits of RGB colors (total of 24 bits), with resolution of 200 dpi.

Referring now to FIG. 4, mechanical structures of the print processor 301 and the reading device 302 are explained according to an example embodiment of the present invention. As illustrated in FIG. 4, the print processor 301 is implemented by a tandem-type image forming device 106, which includes a plurality of image forming devices 106BK, 106M, 106C, and 106Y that are arranged side by side along a transfer belt 105 in a sheet transfer direction. The transfer belt 105, which is an endless belt, functions as an intermediate transfer body onto which an image is transferred from the image forming device 106.

More specifically, the print processor 301 further includes a paper tray 101, a feed roller 102, a separation roller pair 103, a drive roller 107, a driven roller 108, an optical writing device 111, a plurality of transfer devices 115BK, 115M, 115C, and 115Y, and a fixing device 116. In example operation, the feed roller 2 picks up a recording sheet, from a stack of recording sheets which are stored in the paper tray 101. The separation roller pair 103 transfers the recording sheet toward the image forming device 106 such that one sheet is transferred at a time.

The image forming devices 106BK, 106M, 106C, and 106Y each have substantially the same structure except for the color of toner being used to form an image. The image forming devices 106BK, 106M, 106C, and 106Y respectively form a black image, magenta image, cyan image, and yellow image.

The transfer belt 105 is stretched over the drive roller 107 and the driven roller 108, which are respectively rotated in the direction indicated by the arrow. The drive roller 107, which is rotated by a drive motor, and the driven roller 108 that is driven with rotation of the drive roller 107 together drive the transfer belt 105. The optical writing device 111 irradiates lights of respective colors toward the surfaces of a photoconductive drum 109BK, 109M, 109C, and 109Y to form latent images of respective colors thereon.

The image forming device 106BK includes the photoconductive drum 109BK functioning as a photoconductor. Along the circumferential direction of the photoconductive drum 109BK, a charger 110BK, a developer 112BK, a cleaner 113BK, and a discharger are provided. The charger 110BK uniformly charges the surface of the photoconductive drum 109BK. The optical writing device 111 scans lights irradiated from a light source based on the black color image toward the surface of the photoconductive drum 109BK to form a latent image thereon. The developer 112BK develops the latent image into a toner image using black toner to form a black toner image on the photoconductive drum 109BK.

The black toner image is transferred with rotation of the photoconductive drum 109BK to an image transfer nip formed between the photoconductive drum 109BK and the transfer device 115BK via the transfer belt 105, and transferred from the surface of the photoconductive drum 109BK to the surface of the transfer belt 105 at the image transfer nip. As the black toner image is transferred, the black toner image is formed on the surface of the transfer belt 105. After image transfer, the cleaner 113BK removes residual toner from the surface of the photoconductive drum 109BK, for example, with a brush roller. The discharger further discharges the surface of the photoconductive drum 109BK to prepare for subsequent image forming operation.

The black toner image formed on the surface of the transfer belt 105 is transferred toward the image forming device 106M with rotation of the transfer belt 105. The image forming device 106M forms a magenta toner image on the surface of the photoconductive drum 109M, and further transfers the magenta toner image so as to be superimposed on the black toner image carried by the transfer belt 105.

In a substantially similar manner, the cyan toner image formed on the photoconductive drum 109C and the yellow toner image formed on the photoconductive drum 109Y are transferred so as to be superimposed on the black and yellow toner images, thus forming a full-color toner image on the transfer belt 105.

The recording sheet, which is fed from the paper tray 104, is transferred to the driven roller 108. At a position where the driven roller 108 is disposed, the full-color image formed on the transfer belt 105 is transferred onto the recording sheet to form the full-color image on the recording sheet. The recording sheet 104 having the image formed thereon is further transferred to the fixing device 116. The fixing device 116 fixes the image onto the recording sheet by heat and pressure. The recording sheet with the image is discharged from the print processor 301, toward the reading device 302.

In case images are formed on both sides of the recording sheet 104, the recording sheet with the fixed image is transferred to a switch back passage. After the surface of the recording sheet is reversed, the recording sheet is further transferred back to the position where the driven roller 108 is disposed to form an image thereon. The recording sheet having the images formed on both sides of the sheet is then discharged from the print processor 301, toward the recording device 302. The recording device 302 reads the image formed on the recording sheet 104 into read image data, which is subjected for inspection.

Referring back to FIG. 3, the read image obtainer 401 of the inspection apparatus 4 obtains the read image output from the print engine 3, and inputs the read image to the comparator 404 as an image for inspection. The read image obtainer 401 further inputs the preprint image obtained from the reading device 302, to the master image generator 402.

The master image generator 402 obtains the variable image input from the engine controller 2 and the preprint image input from the read image obtainer 401, and generates a master image based on the variable image and the preprint image. The master image is to be compared with the read image subjected for inspection by the inspection apparatus 4. Further, the master image generator 402 performs various processing as a part of registration processing that registers the preprint image.

The inspection controller 403 functions as a controller that controls entire operation of the inspection apparatus 4, for example, by controlling each unit or device of the inspection apparatus 4.

The comparator 404 compares the read image input by the read image obtainer 401 with the master image generated by the master image generator 402 to determine whether the image formed by the print engine 3 is in good quality as expected. The comparator 404 may be implemented by the ASIC of the specialized device 80 such that the comparator 404 is able to compute a large amount of data with high speeds. Further, in this example, the comparator 404 determines a magnification ratio to be used for matching the sizes and positions between the master image and the read image to start comparing the images, before completing reading of one page of the read image that is subjected for image inspection.

Figure 5:
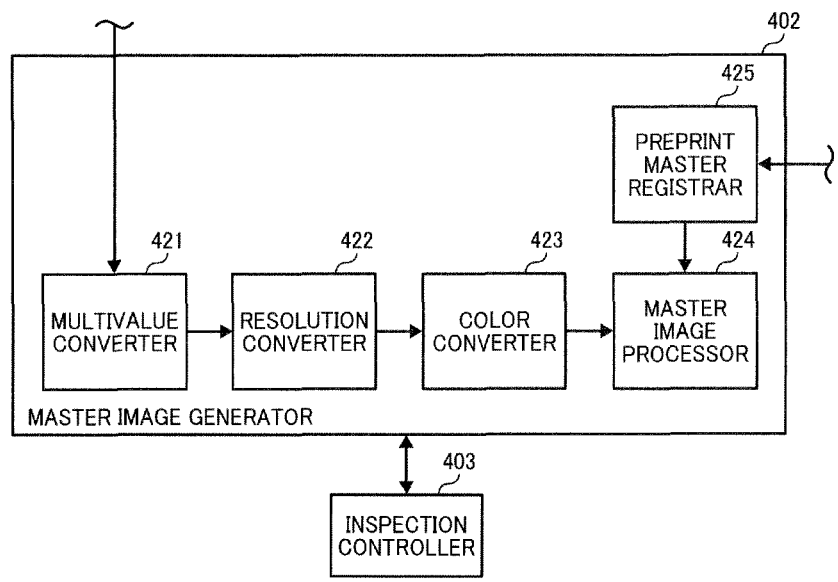
FIG. 5 is a schematic block diagram illustrating a functional structure of a master image generator of the inspection apparatus of FIG. 3, according to an example embodiment of the present invention.

Referring now to FIG. 5, a functional structure of the master image generator 402 is explained according to an example embodiment of the present invention. As illustrated in FIG. 5, the master image generator 402 includes a multivalue converter 421, a resolution converter 422, a color converter 423, a master image processor 424, and a preprint master registrar 425. The master image generator 402 may be implemented by a hardware, such as the specialized device 80.

The multivalue converter 421 obtains the binary image from the engine controller 2, and converts the binary image into a multivalue image. In the binary image, each image pixel is expressed as colored or colorless. In this example, the variable image is input to the print engine 3 in the form of binary image of each one of the colors including cyan, magenta, yellow, and black. On the other hand, the read image, subjected for inspection, is a multivalue image having tones for each color of the colors including red, green, and blue. The multivalue converter 421 converts the binary image into the multivalue image, such as the multivalue image in which each color of cyan, magenta, yellow, and black is expressed in 8-bit.

In this example, the print engine 3 outputs an image based on the binary image of C, M, Y, and K colors, and the multivalue converter 421 of the master image generator 402 converts the binary image into the multivalue image. Alternatively, the multivalue converter 421 does not have to be provided, if the print engine 3 outputs an image based on the multivalue image.

The resolution converter 422 applies resolution conversion to the multivalue image generated by the multivalue converter 421 to output a halftone image. The halftone image is a multivalue image in which each image pixel is expressed by eight bits of CMYK colors, with resolution of 200 dpi. The resolution converter 422 converts resolution of the multivalue image such that the converted multivalue image has a resolution that matches the resolution of the read image generated by the reading device 302.

The color converter 423 applies color conversion to the halftone image generated by the resolution converter 422 to generate a master image of the variable image data. More specifically, the color converter 423 converts the image input from the resolution converter 422, from CMYK to RGB. The master image of the variable image data is a multivalue image in which each image pixel is expressed by eight bits of RGB colors (total of 24 bits), with resolution of 200 dpi. In this manner, the multivalue image, i.e., the master image of the variable image data, has a data format that is equal to the data format of the read image generated by the reading device 302. The master image of the variable image data is referred to as the variable master image, which may be used as an inspection image to be compared with the read image. The variable master image may be stored in any desired memory. As described above, in this example, the multivalue converter 421, the resolution converter 422, and the color converter 423 together function as an inspection image generator.

The preprint master registrar 425 registers the preprint image input from the read image obtainer 401. The preprint image may be alternatively referred to as a previously displayed inspection image. In the process of registering the preprint image, the preprint master registrar 425 generates a mask image that can selectively mask the preprint image or the variable image (the output target image), selects a reference point to be used for matching the positions of the images, and calculates a magnification ratio to be used for correcting the image size.

Figure 6:
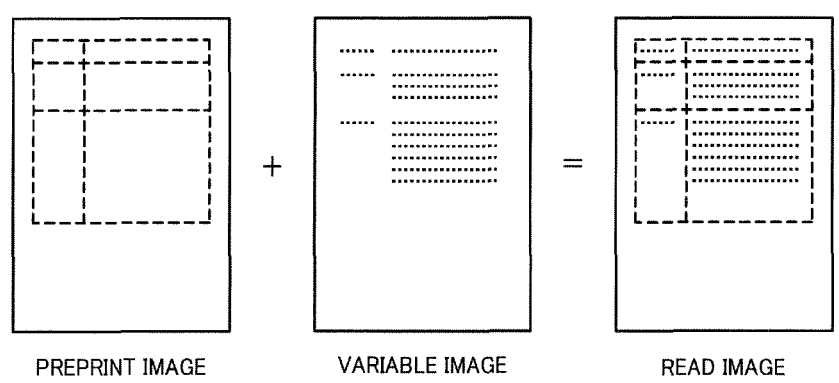
FIG. 6 is an illustration for explaining operation of generating a master image according to an example embodiment of the present invention.

The master image processor 424 processes the preprint image that is registered by the preprint master registrar 425, and the variable master image, to generate the master image. In the preprint processing, as illustrated in FIG. 6, the inspection apparatus 4 obtains the read image subjected for inspection, which is generated by combining the preprint image and the variable master image. The master image processor 424 stores the preprint master image and the variable master image, respectively, such that the preprint image and the variable image of the read image can be respectively compared.

Figure 7:
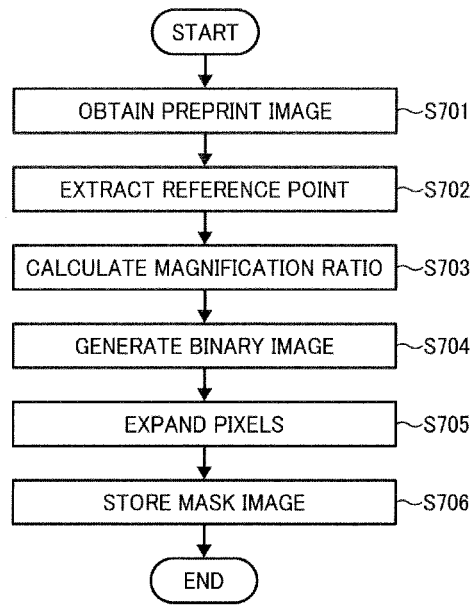
FIG. 7 is a flowchart illustrating operation of registering a preprint image, performed by the inspection apparatus of FIG. 3, according to an example embodiment of the present invention.

Referring now to FIG. 7, operation of registering the preprint image, performed by the preprint master registrar 425, is explained according to an example embodiment of the present invention. In this example, a preprint sheet having a preprint image formed thereon is transferred, from the paper tray 101 of the print processor 301, to the reading device 302, in a substantially similar manner as described above in the example case of transferring the recording sheet having the image formed thereon referring to FIG. 4. The reading device 302 reads a surface of the preprint sheet to generate the preprint image, and inputs the preprint image to the read image obtainer 401. For example, the user may instruct the image forming system of FIG. 1 to print blank data onto the preprint sheet.

Referring to FIG. 7, at S701, the preprint master registrar 425 obtains the preprint image from the read image obtainer 401, and stores the preprint image in a desired memory such as the RAM 20 as a preprint master image. The preprint master image may be alternatively referred to as a previously displayed inspection image.

At S702, the preprint master registrar 425 extracts a reference point, which is referred to by the comparator 404 in the process of matching the position or size of the read image with respect to the master image. The preprint master registrar 425 may extract a reference point, by detecting a print marker by pattern matching, or extracting a characteristic point based on image processing. In this example, more than one reference point may be extracted as a reference point, or a reference location, to be used for correcting the size or position of the images, or comparison of the images.

Figure 8:
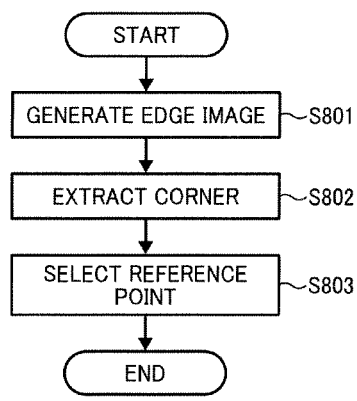
FIG. 8 is a flowchart illustrating operation of setting a reference point in the image, performed by the inspection apparatus of FIG. 3, according to an example embodiment of the present invention.

As one example, operation of extracting a reference point based on specifying a characteristic point is explained with reference to FIG. 8.

At S801, the preprint master registrar 425 generates an edge image based on the preprint image. More specifically, the preprint master registrar 425 applies an edge extraction filter as illustrated in FIG. 9 to the preprint image to extract an edge in the preprint image. The edge extraction filter of FIG. 9 is referred to as a Laplasian filter, which extracts the edge in the image based on the difference in image pixel between the adjacent pixels. Assuming that the edge extraction filter of FIG. 9 is applied to an image of FIG. 10A, the edge of the image is extracted as illustrated in FIG. 10B. In FIG. 10A, an area shown by diagonal lines is assumed to be a solid image area. In alternative to applying the edge extraction filter of FIG. 9, the edge image may be extracted using any desired technique.

At S802, the preprint master registrar 425 applies a plurality of filters to the edge image extracted at S801 to extract the corners of the edge image. For example, by applying corner extraction filters of FIGS. 11A to 11D to the edge image of FIG. 10B, four corners of the edge image are extracted as illustrated in FIG. 10C. The corner extraction filters of FIG. 11A to 11D each extract the corner in the image based on the difference in image pixel between the adjacent pixels.

More specifically, the preprint master registrar 425 segments the preprint image into a plurality of areas, as illustrated in FIG. 12. The area A is applied with the corner extraction filter of FIG. 11A to extract the upper left corner of the image. The area B is applied with the corner extraction filter of FIG. 11B to extract the upper right corner of the image. The area C is applied with the corner extraction filter of FIG. 11C to extract the lower left corner of the image. The area D is applied with the corner extraction filter of FIG. 11D to extract the lower right corner of the image. In this manner, four corners of the preprint image illustrated in FIG. 10C can be extracted from the edge image of FIG. 10B.

When the corners of the preprint image are specified, at S803, the preprint master registrar 425 selects the coordinate value of the corner for each one of the areas A to D of the preprint image of FIG. 12, as a reference point. The preprint master registrar 425 assigns an identification number ("coordinate number") to the coordinate value of the selected reference point, and stores the coordinate number and the coordinate value for each one of the reference points, that is, the corners of the preprint image, in association with another to generate a reference point table of FIG. 13. The reference point table of FIG. 13 may be stored in any desired memory of the inspection apparatus 4.

In the above-described example, four corners of the preprint image are extracted using the corner extraction filters of FIG. 11A to 11D. Alternatively, any desired technique may be applied to extract the edges or the corners of the preprint image. For example, each area of the preprint image may be applied with the corner extraction filters of FIG. 11A to 11D to extract the corners of the preprint image. For each one of the areas A to D of FIG. 12, the corner that is located closely to the edge may be selected as a reference point. Further, in alternative to extracting the corner after extracting the edge image, the corner extraction filters may be applied to the preprint image of FIG. 10A.

When the reference point is extracted at S702, the operation proceeds to S703. At S703, the preprint master registrar 425 calculates a magnification ratio. As described above, the size of the read image may change, for example, as the recording sheet shrinks due to heat applied at the fixing device 116. The preprint master registrar 425 calculates a magnification ratio, based on the ratio of the distance between the reference points extracted at S702 with a predetermined value. The calculated magnification ratio is stored in any desired memory as a calculation result.

Alternatively, the reading device 302 may be placed in the print processor 301 at a position such that the reading device 302 can read the printed image formed on the recording sheet, before the recording sheet enters the fixing position at the fixing device 116, to generate the read image reflecting the unfixed printed image. The distance between the reference points may be used as a threshold value to be compared with the distance between the reference points obtained from the read image reflecting the fixed printed image.

At S704, the preprint master registrar 425 generates a binary image of the preprint image, and uses the binary image as a mask image to mask one of the preprint image or the variable image. For example, the preprint master registrar 425 compares the pixel value of each pixel in the preprint image with a predetermined threshold value to generate a comparison result, and determines whether the pixel belongs to white pixel or black pixel based on the comparison result.

At S705, the preprint master registrar 425 applies expansion processing to the binary image of the preprint image. When the expansion processing is applied to the binary image having black and white pixels, the black pixels are thickened, for example, by making the pixels near the black pixel to be the black pixels. For example, assuming that an original image contains 4 black pixels (shown in diagonal lines) as illustrated in FIG. 14A, the black pixels are expanded so that the two pixels are added in the vertical and horizontal directions as illustrated in FIG. 14B.

At S706, the preprint master registrar 425 stores the processed binary image as a mask image. The master image may be used to determine whether each pixel in the read image belongs to the preprint image, or to the variable image (output target image). Further, by applying expansion processing to the binary image of the preprint image, which functions as the mask image, the registration shift of a few pixels, which may have occurred, can be compensated.

As described above, even when the preprint image may not be available, the preprint master registrar 425 can generate the preprint image, by reading the preprint sheet having the preprint image formed thereon, using the reading device 302. The reading device 302 preferably reads the preprint sheet, which is transferred through the fixing device 116, to obtain the preprint image. In this manner, the preprint image is obtained while taking into account shrinking of the image that may be caused as the recording sheet passes the fixing device 116.

Figure 15:
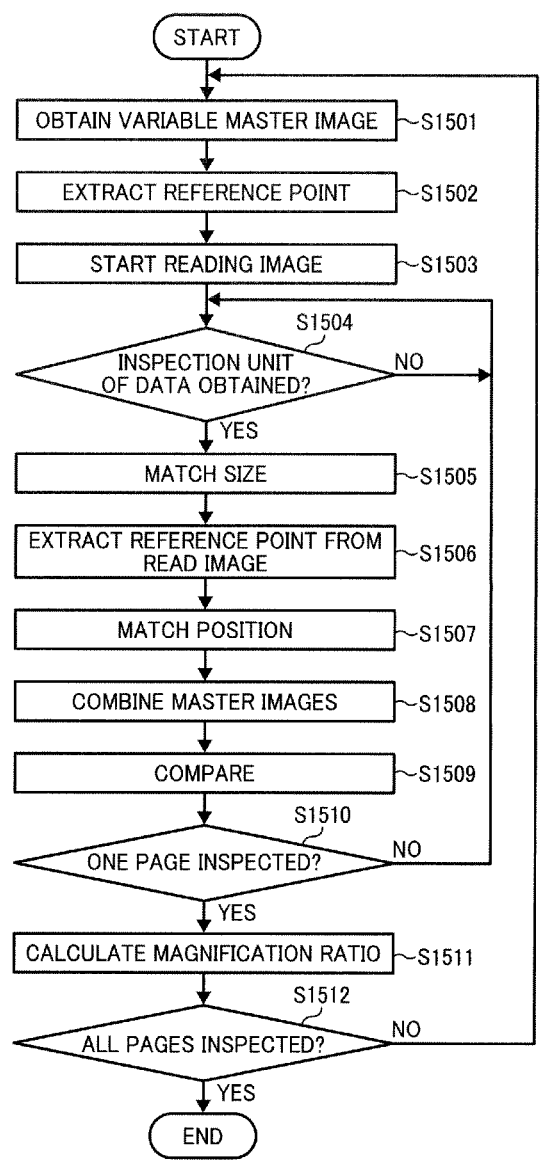
FIG. 15 is a flowchart illustrating operation of inspecting the read image, performed by the inspection apparatus of FIG. 3, according to an example embodiment of the present invention.

Referring now to FIG. 15, operation of inspecting the read image, performed by the inspection apparatus 4, specifically, the comparator 404 under control of the inspection controller 403, is explained according to an example embodiment of the present invention.

At S1501, the comparator 404 obtains the variable master image from the inspection controller 403.

At S1502, the comparator 404 extracts one or more reference points in the variable master image in a substantially similar manner as described above referring to S702 of FIG. 7.

At S1503, the inspection controller 403 instructs the image read obtainer 401 to start reading the read image, which is being read by the reading device 302 from the printed image formed on the recording sheet by the print processor 301. At substantially the same time, the inspection controller 402 instructs the comparator 404 to start reading the read image from the image read obtainer 401.

In this example, the reading device 302 reads the printed image formed on the recording sheet, line by line, in the main scanning direction to generate read image data. The read image obtainer 401 obtains the read image from the reading device 302, line by line, in the main scanning direction. Accordingly, the comparator 404 obtains the read image from the read image obtainer 401, line by line, in the main scanning direction. Further, the comparator 404 starts counting a number of lines being obtained to output a counted number of lines.

At S1504, the comparator 404 monitors the counted number of lines, to determine whether the counted number of lines reaches a predetermined number of lines that is previously determined as an inspection unit subjected for inspection. When it is determined that the counted number of lines does not reach the predetermined number of lines, that is, the inspection unit ("NO" at S1504), the operation repeats S1504.

When it is determined that the counted number of lines reaches the predetermined number of lines, that is, the inspection unit ("YES" at S1504), the operation proceeds to S1505.

At S1505, the comparator 404 matches the size of the read image with respect to the master image, using the magnification ratio calculated at S703 of FIG. 7. More specifically, the comparator 404 changes the size of the read image based on the magnification ratio stored in the memory to match the size of the read image with that of the master image. More specifically, in this example, only a part of the read image corresponding to the inspection unit is corrected in size. Alternatively, the master image, that is, the preprint master image and the variable master image, may be changed in size to match with the size of the read image. It is, however, preferable to change the size of the read image, thus reducing the processing load.

At S1506, the comparator 404 extracts one or more reference points in the read image, to which size correction is applied, in a substantially similar manner as described above referring to S1502 of FIG. 15. More specifically, the comparator 404 masks a variable image layer in the read image using the mask image generated at S706 of FIG. 7, to extract a reference point from the preprint image layer of the read image. The comparator 404 masks the preprint image layer in the read image using the mask image generated at S706 of FIG. 7, to extract a reference point from the variable image layer of the read image.

Figure 16:
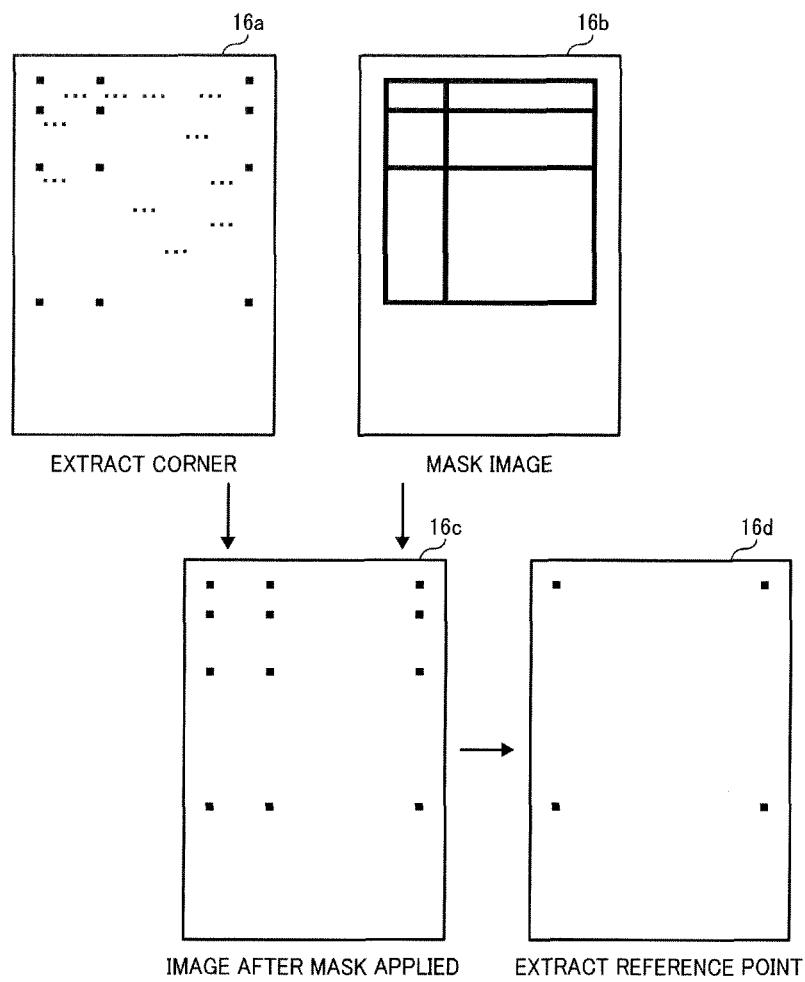
FIG. 16 is an illustration for explaining operation of extracting a reference point.

FIG. 16 illustrates example operation of extracting a reference point, which may be performed at S1506. In FIG. 16, the comparator 404 masks the variable image layer in the read image using the mask image to extract a reference point from the preprint image layer.

In a substantially similar manner as described above referring to S702 of FIG. 7, the comparator 404 extracts corners in the read image to generate a corner image 16a of FIG. 16. The comparator 404 uses a mask image 16b (FIG. 16), which is stored at S706 of FIG. 7, to mask any white portion in the mask image 16b in the read image. The white portion of the mask image 16b corresponds to any portion other than the preprint image, such as any portion other than the frame of the preprint image.

In FIG. 16, only one page of image data is illustrated for simplicity. As described above, the read image to be processed at S1505 may be a portion of the read image extracted based on the inspection unit. In such case, a portion of the mask image corresponding to the inspection unit of the read image is only applied to mask the inspection unit of the read image. The inspection unit of the read image may be set to about one forth of one-page image data in the sub-scanning direction.

Through masking the preprint image, the comparator 404 obtains a masked image 16c of FIG. 16, which contains the corners extracted from the frame of the preprint image in the read image.

The comparator 404 selects a reference point from the corners of the masked image of FIG. 16c, as illustrated in an image 16d containing the reference point, in a substantially similar manner as described above referring to S702 of FIG. 7.

The comparator 404 extracts one or more reference points from the variable image layer in the read image, by masking the preprint image layer of the read image, in a substantially similar manner as described above.

At S1507, the comparator 404 matches the position of the read image, with respect to the variable master image and the preprint master image. More specifically, the comparator 404 adjusts the position of the read image with respect to the position of the variable image, based on the reference point in the variable master image that is extracted at S1502, and the reference point in the variable image layer of the read image that is extracted at S1506. The comparator 404 adjusts the pixel position of the read image in the vertical or horizontal direction, such that the reference point in the read image and the reference point in the variable master image are on the same coordinate. The coordinate value, which is shifted in the vertical or horizontal direction, is output as a position match result based on the variable master image.

The comparator 404 adjusts the position of the read image with respect to the position of the preprint image, based on the reference point in the preprint master image that is extracted at S702 of FIG. 7, and the reference point in the preprint image layer of the read image that is extracted at S1505. The comparator 404 adjusts the pixel position of the read image in the vertical or horizontal direction, such that the reference point in the read image and the reference point in the preprint master image are on the same coordinate. The coordinate value, which is shifted in the vertical or horizontal direction, is output as a position match result based on the preprint master image.

At S1508, the comparator 404 combines the variable master image and the preprint master image, which are matched in their positions based on the position match results obtained at S1507, to generate the master image.

As described above referring to FIG. 4, the print processor 301 forms an image on the recording sheet, which is being transferred. In such case, the position on the recording sheet on which the image is formed may be shifted, causing a registration shift. This registration shift, even the shift in a few pixels that is not recognizable by the human eye, may have negative influences in image inspection.

In this example, the position of the variable image in the read image is matched with the variable master image, and the position of the preprint image in the read image is matched with the preprint master image, before combining the variable master image and the preprint master image.

At S1509, the comparator 404 compares the read image with the master age. More specifically, the comparator 404 compares the pixel value of each pixel in the read image with the pixel value of the corresponding pixel in the master image, to generate the difference value.

If the printed image is accurately formed at the right position on the recording sheet, and operation of adjusting the size and the position of the read image with the master image is successfully performed, there should be no difference or little difference in pixel value between the master image and the read image. In such case, the pixels in the read image and the pixels in the master image should have substantially the same results in terms of halftone values such that the difference should be nearly zero. On the other hand, if the image is not formed at the right position on the recording sheet, the pixels in the read image should differ from the pixels in the master image in terms of halftone values, such that the difference is not zero.

The comparator 404 detects a defect in the read image based on the differential image, or the difference value, by comparing the difference value with a predetermined threshold. In one example, a threshold value may be set for each one of the R plane, G plane, and B plane of the image data. In such case, the difference value is compared with the threshold value for each of the colors of R, G and B. In another example, the comparator 404 may calculate the color shift entirely in brightness, tone, and hue, based on the differences obtained from the R, G, and B planes. Based on comparison between the color shift with a predetermined value, the comparator 404 may determine a defect in the read image. When it is determined that the difference value exceeds the predetermined value, the comparator 404 determines that there is a defect in the read image.

At S1510, the comparator 404 determines whether inspection is completed for one page of image data. When it is determined that inspection is not completed ("NO" at S1510), the operation returns to S1504 to perform S1504 to S1509 for the other portion of the read image. Since the positional shift should be the same for all of the portions in the same page, if the portion subjected for inspection belongs to the same page having the position that is previously adjusted, the comparator 404 does not have to perform S1506. The comparator 404 adjusts the position of the read image, based on the position match results obtained at S1507. This reduces the processing load, thus reducing the processing time required for inspection.

When it is determined that inspection is completed ("YES" at S1510), the comparator 404 should have the read image of one page, as well as, the reference points extracted from the read image.

At S1511, the comparator 404 calculates a magnification ratio of the read image with respect to the master image, based on the reference points extracted. In this example, the comparator 404 may compare, in a substantially similar manner as described above referring to S703 of FIG. 7. Alternatively, the comparator 404 may obtain a magnification ratio, based on the ratio of the distance between the reference points in the variable image layer of the read image that is extracted at S1506, with a predetermined value. Alternatively, the comparator 404 may obtain a magnification ratio, based on the distance between the reference points in the variable image layer of the read image that is extracted at S1506, with the distance between the reference points in the variable master image.

The magnification ratio obtained at S1511 may be used to adjust the size of the read image at S1505, for the next page to be processed. More specifically, in this example, the magnification ratio is updated every time one page of the read image is processed. Since the magnification ratio is constantly updated to reflect the change in environments, such as the apparatus state, the accuracy in image inspection increases. Assuming that the temporal change that affects the magnification ratio is small, the magnification ratio may be updated ever time a predetermined number of pages of the read image are processed.

At S1512, the comparator 404 determines whether inspection is completed for all pages to be processed. When it is determined that inspection is not completed ("NO" at S1512), the operation returns to S1501 to process a next page. When it is determined that inspection is completed ("YES" at S1512), the operation ends.

As described above, in this example, the inspection apparatus 404 calculates a magnification ratio to be used for adjusting the size of the read image, before starting inspection of the read image. For example, the magnification ratio is calculated in the process of registering the preprint master image. The inspection apparatus 4 does not have to wait till the one page of the read image is obtained, but can start inspection of the read image, for example, when at least a portion of the read image that is subjected for inspection is obtained. For example, when a predetermined inspection unit of the read image in the sub-scanning direction is obtained, such as one fourth of the read image is obtained, the comparator 404 may start inspecting the read image.

Figure 17:
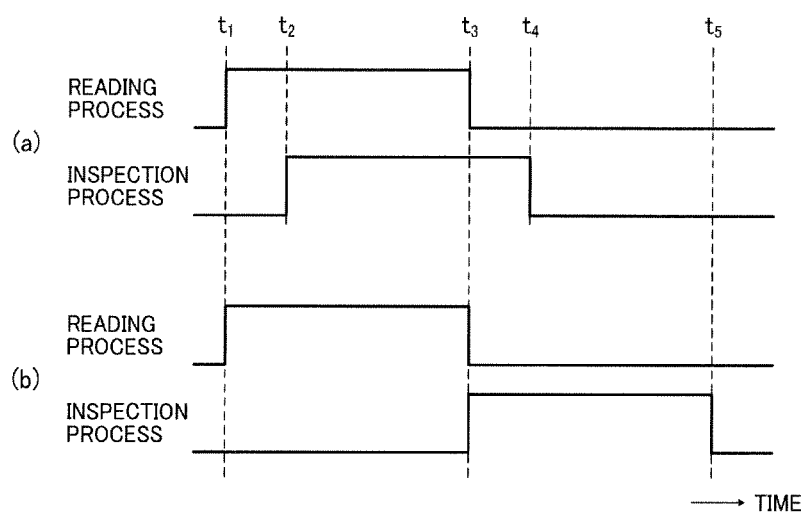
FIG. 17 is a timing chart illustrating operation of obtaining a read image read from a printed image, and operation of inspecting the read image.

FIG. 17 are timing charts illustrating operation of obtaining a read image, and operation of inspecting the read image. The timing chart of FIG. 17(a) illustrates a case in which inspection operation is performed after completing reading operation according to the background art. The timing chart of FIG. 17(b) illustrates a case in which inspection operation is performed concurrently with reading operation, as described above.

The reading operation starts at time t1. At time t3, one page of read image is obtained. In this example, inspection operation starts at time 12, when one inspection unit of image data is obtained and before completing reading operation for one page. According to the background art, inspection operation starts at time t3, after the magnification ratio is obtained based on the reading result of one page.

Accordingly, in this example, inspecting operation completes at time t4, which is much faster than time t5 at which inspection operation completes for the background art. This greatly reduces the processing time required for inspecting the image.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, in alternative to calculating the magnification ratio based on comparison in distance between the reference points, the comparator 404 may generate a projection waveform in the vertical and horizontal directions, and adjusts the peaks of the projection waveform, to match the size of the read image with the master image.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

As described above, in this example, the inspection apparatus 4 calculates a magnification ratio to be used for matching the positions of the read image and the preprint master image, based on the preprint image. The inspection apparatus 4 corrects the size of the read image with respect to that of the master image using the magnification ratio. The inspection apparatus compares a portion of the read image and a corresponding portion of the master image, when reading of the portion of the read image is completed that corresponds to an inspection unit previously determined.

In one example, the present invention may reside an image inspection apparatus that inspects a read image obtained by reading a printed image using a reading device, the printed image being formed by an image forming device on a recording sheet having a previously displayed image formed thereon. The inspection apparatus includes: a previously displayed inspection image processor that obtains previously displayed image data, which is read from a surface of the recording sheet having only the previously displayed image formed thereon, and stores the previously displayed image data in a memory as a previously displayed inspection image; an inspection image generator that obtains an output target image to be formed by the image forming device and generates an inspection image to be used for inspecting the read image based on the output target image; an image magnification processor that changes the size of the inspection image or the read image so as to match the sizes of the inspection image and the read image; and an image inspector that compares between the inspection image combined with the previously displayed inspection image and having the size that matches the read image, and the read image, to inspect the read image. The previously displayed inspection image processor previously calculates a magnification ratio to be used for matching the sizes of the inspection image and the read image, based on the previously displayed image. The image magnification processor changes the size of at least one of the inspection image or the read image, based on the magnification ratio that is previously obtained. The image inspector starts inspecting a portion of the read image being input from the reading device, every time the portion of the read image reaches an inspection unit that is previously determined, to output a comparison result on the inspection unit basis. For example, the inspection unit of the read image is previously determined to be a portion of one page of the read image.

For example, the previously displayed inspection image processor corresponds to the master image generator 402, such as the preprint master registrar 425 that obtains and stores the preprint image read from the reading device as the preprint master image. The inspection image generator corresponds to the master image generator 402, such as the multivalue converter 421, the resolution converter 422, and the color converter 423. The image magnification processor corresponds to the comparator 404. The image inspector corresponds to the comparator 404. Any one of the master image generator and the comparator may be implemented by a processing circuit such as the specialized device 80, or a processor, such as the CPU 10, which executes software stored in any desired memory.

In another example, the image inspector calculates a magnification ratio to be used for matching the sizes of a read image and an inspection image for next processing based on the processed read image, every time reading of a predetermined number of pages of the read image completes. For example, the predetermined number of pages may be one page.

In another example, the image inspector matches the position of the portion of the read image with respect to the position of a corresponding portion of the inspection image to generate a position match result. The image inspector compares between the read image and the inspection image after correcting the position of the read image or the inspection image using the position match result. The position match result generated for a specific portion of the read image may be used to correct the position of the other portion of the read image, if the specific portion of the read image and the other portion of the read image both belong to the same page.

In another example, the previously displayed inspection image processor generates determination data to be used for determining whether each pixel in the inspection image corresponds to a display area of the previously displayed image or to a display area of the output target image, based on the previously displayed image data. The image inspector refers to the determination data to match the positions of the portion of the previously displayed image and the inspection image.

For example, the determination data may be a mask image, which is generated based on the preprint master image.

In another example, the image inspector refers to the determination data to match the position of the portion of the read image and the previously displayed inspection image, based on the matched positions of the portion of the previously displayed image and the previously displayed inspection image. The image inspector refers to the determination data to match the position of the portion of the read image and the inspection image, based on the matched positions of the portion of the output target image and the inspection image. The image inspector further combines the previously displayed image and the inspection image after correcting the positions, and compares the portion of the read image with the combined image.

In another example, the previously displayed inspection image processor calculates the magnification ratio, based on a ratio between a distance of a plurality of reference points extracted from the previously displayed image, with a predetermined value.

What is claimed is:

1. An image inspection apparatus that inspects a read image generated by reading a printed image formed on a cut recording sheet, the apparatus comprising a processor configured to:
    obtain a preprint inspection image that reflects an image previously formed on the cut recording sheet;
    obtain an output target inspection image generated based on an image formed on the cut recording sheet having the preprint image previously formed,
    the preprint inspection image being combined with the output target inspection image to generate a master image;
    determine whether a portion of the read image being read from the printed image of the cut recording sheet reaches an inspection unit of data subjected for inspection,
    the inspection unit of data being a portion of the data that corresponds to a predetermined portion of one sheet of the cut recording sheet having the printed image thereon;
    correct the size of at least one of the read image or the master image using a magnification ratio to match the sizes of the read image and the master image for the read portion of the read image that corresponds to the predetermined portion of one sheet of the cut recording sheet when the read portion reaches the inspection unit of data, the magnification ratio being previously obtained based on the preprint inspection image; and
    compare the read portion of the read image with a corresponding portion of the master image to inspect the read portion of the read image that corresponds to the predetermined portion of one sheet of the cut recording sheet.

2. The image inspection apparatus of claim 1, wherein the processor is further configured to:
    determine whether inspection has been completed for the read image that corresponds to one sheet of the cut recording sheet,
    calculate an updated magnification ratio based on the read image having the corrected size based on determination that the read image that corresponds to one sheet of the cut recording sheet has been inspected, wherein the updated magnification ratio is to be used for matching the sizes of at least a portion of the read image that is to be read from the printed image, and a corresponding portion of the master image.

3. The image inspection apparatus of claim 1, wherein the read image that corresponds to one sheet of the cut recording sheet is an image that corresponds to one page of the cut recording sheet.

4. The image inspection apparatus of claim 1, wherein the processor is further configured to:
    match the position of the read portion of the read image with the position of a corresponding portion of the master image to generate a position match result,
    wherein the processor compares between the read image and the master image after correcting the position of the read portion of the read image or the position of the corresponding portion of the master image using the position match result.

5. The image inspection apparatus of claim 4, wherein, when the processor obtains an additional portion of the read image that belongs to the same page from which the inspected portion of the read image is read, the processor corrects the position of the additional portion of the read image using the position match result obtained for the inspected portion of the read image.

6. The image inspection apparatus of claim 1, wherein the processor is further configured to,
generate a mask image based on the preprint inspection image, the mask image being used for determining whether each pixel in the master image corresponds to drawing data of the preprint inspection image or to drawing data of the output target inspection image,
wherein the processor matches the positions of the preprint inspection image and the output target inspection image for the read portion of the read image, using the mask image.

7. The image inspection apparatus of claim 6, wherein the processor is further configured to,
match the position of the read portion of the read image with a corresponding portion of the preprint inspection image, based on the matched position of the read portion of the preprint image with a corresponding portion of the preprint inspection image; and
match the position of the read portion of the read image with a corresponding portion of the output target inspection image, based on the matched position of the read portion of the output target image with a corresponding portion of the output target inspection image,
wherein the read portion of the read image is compared with a corresponding portion of the master image generated by combining the preprint inspection image and the output target inspection image that are respectively matched in their positions.

8. The image inspection apparatus of claim 1, wherein the processor is configured to:
extract a plurality of reference points from the preprint inspection image; and
compare a distance between at least two of the plurality of reference points, with a predetermined value, to generate a comparison result,
wherein the magnification ratio is determined based on the comparison result.

9. An image forming system, comprising: an image forming device configured to form the printed image on the recording sheet, the printed image being read by a reading device as the recording sheet is transferred from the image forming device to the image inspection apparatus; and
the image inspection apparatus of claim 1.

10. An image inspection method of inspecting a read image generated by reading a printed image formed on a cut recording sheet, the image inspection method comprising:
obtaining a preprint inspection image that reflects an image previously formed on the cut recording sheet;
obtaining an output target inspection image generated based on an image formed on the cut recording sheet having the preprint image previously formed, the preprint inspection image being combined with the output target inspection image to generate a master image;
determining whether a portion of the read image being read from the printed image of the cut recording sheet reaches an inspection unit of data subjected for inspection, the inspection unit of data being a portion of the data that corresponds to a predetermined portion of one sheet of the cut recording sheet having the printed image thereon;
correcting the size of at least one of the read image or the master image using a magnification ratio to match the sizes of the read image and the master image for the read portion of the read image that corresponds to the predetermined portion of one sheet of the cut recording sheet when the read portion reaches the inspection unit of data, the magnification ratio being previously obtained based on the preprint inspection image; and
comparing the read portion of the read image with a corresponding portion of the master image to inspect the read portion of the read image that corresponds to the predetermined portion of one sheet of the cut recording sheet.

11. The image inspection method of claim 10, further comprising: determining whether inspection is completed for the read image that corresponds to one sheet of the cut recording sheet;
calculating an updated magnification ratio based on the read image having the corrected size based on determination that the read image that corresponds to one sheet of the cut recording sheet is inspected, wherein the updated magnification ratio is to be used for matching the sizes of at least a portion of the read image that is to be read from the printed image, and a corresponding portion of the master image.

12. The image inspection method of claim 10, wherein the read image that corresponds to one sheet of the cut recording sheet is an image that corresponds to one page of the cut recording sheet.

13. The image inspection method of claim 10, further comprising:
matching the position of the read portion of the read image with the position of a corresponding portion of the master image to generate a position match result,
wherein the read image and the master image are compared with each other after correcting the position of the read portion of the read image or the position of the corresponding portion of the master image using the position match result.

14. The image inspection method of claim 13, further comprising:
obtaining an additional portion of the read image that belongs to the same page from which the inspected portion of the read image is read;
correcting the position of the additional portion of the read image using the position match result obtained for the inspected portion of the read image.

15. The image inspection method of claim 10, further comprising: generating a mask image based on the preprint inspection image, the mask image being used for determining whether each pixel in the master image corresponds to drawing data of the preprint inspection image or to drawing data of the output target inspection image,
wherein the positions of the preprint inspection image and the output target inspection image are matched for the read portion of the read image, using the mask image.

16. The image inspection method of claim 15, further comprising: matching the position of the read portion of the read image with a corresponding portion of the preprint inspection image, based on the matched position of the read portion of the preprint image with a corresponding portion of the preprint inspection image; and
matching the position of the read portion of the read image with a corresponding portion of the output target inspection image, based on the matched position of the read portion of the output target image with a corresponding portion of the output target inspection image,
    wherein the read portion of the read image is compared with a corresponding portion of the master image generated by combining the preprint inspection image and the output target inspection image that are respectively matched in their positions.

17. The image inspection method of claim 10, further comprising: extracting a plurality of reference points from the preprint inspection image; and
    comparing a distance between at least two of the plurality of reference points, with a predetermined value, to generate a comparison result,
    wherein the magnification ratio is determined based on the comparison result.

18. A non-transitory recording medium storing a plurality of instructions which, when executed by a processor, cause the processor to perform an image inspection method of inspecting a read image generated by reading a printed image formed on a cut recording sheet,
    the image inspection method comprising:
    obtaining a preprint inspection image that reflects an image previously formed on the cut recording sheet;
    obtaining an output target inspection image generated based on a variable image formed on the cut recording sheet having the preprint image previously formed, the preprint inspection image being combined with the output target inspection image to generate a master image;
    determining whether a portion of the read image being read from the printed image of the cut recording sheet reaches an inspection unit of data subjected for inspection, the inspection unit of data being a portion of the data that corresponds to a predetermined portion of one sheet of the cut recording sheet having the printed image thereon;
    correcting the size of at least one of the read image or the master image using a magnification ratio to match the sizes of the read image and the master image for the read portion of the read image that corresponds to the predetermined portion of one sheet of the cut recording sheet when the read portion reaches the inspection unit of data, the magnification ratio being previously obtained based on the preprint inspection image; and
    comparing the read portion of the read image with a corresponding portion of the master image to inspect the read portion of the read image that corresponds to the predetermined portion of one sheet of the cut recording sheet.

19. The non-transitory recording medium of claim 18, wherein the read image that corresponds to one sheet of the cut recording sheet is an image that corresponds to one page of the cut recording sheet.

20. The non-transitory recording medium of claim 18, wherein the method further comprises:
    matching the position of the read portion of the read image with the position of a corresponding portion of the master image to generate a position match result,
    wherein the read image and the master image are compared with each other after correcting the position of the read portion of the read image or the position of the corresponding portion of the master image using the position match result.

* * * * *